United States Patent [19]

Onishi

[11] Patent Number: 5,611,880
[45] Date of Patent: Mar. 18, 1997

[54] PHOTOFORMING METHOD AND APPARATUS

[75] Inventor: Hisatomo Onishi, Tokyo, Japan

[73] Assignee: Teijin Seiki Co., Ltd., Osaka, Japan

[21] Appl. No.: 314,926

[22] Filed: Sep. 29, 1994

Related U.S. Application Data

[60] Continuation-in-part of Ser. No. 114,829, Sep. 2, 1993, abandoned, which is a division of Ser. No. 18,196, Feb. 16, 1993, abandoned.

[30] Foreign Application Priority Data

Feb. 10, 1992 [JP] Japan .................................. 4-032470

[51] Int. Cl.$^6$ .................................................. B32B 31/00
[52] U.S. Cl. ...................... 156/234; 156/235; 156/238; 156/239; 156/275.5; 156/307.7; 156/379.8; 264/405
[58] Field of Search ............................ 156/58, 59, 234, 156/235, 238, 239, 275.5, 307.7, 379.6, 379.8, 380.9, 540; 425/174.4; 264/401, 405

[56] References Cited

U.S. PATENT DOCUMENTS

| | | | |
|---|---|---|---|
| 4,801,477 | 1/1989 | Fudim | 427/54.1 X |
| 4,961,154 | 10/1990 | Pomerantz | 364/522 X |
| 5,015,312 | 5/1991 | Kinzie | 156/63 X |
| 5,059,266 | 10/1991 | Yamane et al. | 156/64 |
| 5,122,441 | 7/1992 | Lawton | 430/320 X |
| 5,135,379 | 8/1992 | Fudim | 425/174.4 X |
| 5,143,817 | 8/1992 | Lawton | 430/269 X |
| 5,171,490 | 12/1992 | Fudim | 264/22 X |
| 5,175,077 | 12/1992 | Grossa | 430/327 X |
| 5,183,598 | 2/1993 | Nellé | 264/22 X |
| 5,192,559 | 3/1993 | Hull et al. | 156/379.6 |
| 5,236,326 | 8/1993 | Grossa | 425/174.4 X |
| 5,236,812 | 8/1993 | Vassiliou | 430/327 X |

*Primary Examiner*—James Sells
*Attorney, Agent, or Firm*—Lane, Aitken & McCann

[57] ABSTRACT

A method of photoforming a three-dimensional object, comprising the steps of transferring onto a work table a semi-hardened layer of a photohardenable resin separably supported on a base film, photoforming a hardened layer by exposing the semi-hardened layer, the hardened layer being laminated on a previously hardened layer to photoform the three-dimensional object, and when the hardened layer is photoformed, photoforming a first-region hardened layer forming the three-dimensional object and also a second region hardened layer that is adjacent to the first-region hardened layer through a predetermined space, the first-region hardened layer being supported through a portion of the semi-hardened layer by the second-region hardened layer.

An apparatus for photoforming a three-dimensional object, comprising a transfer unit for transferring onto a work table a semi-hardened layer of a photohardenable resin separably supported on a base film, and an irradiation unit for photoforming a hardened layer by exposing the semi-hardened layer, the hardened layer being laminated on a previously hardened layer to photoform the three-dimensional object.

6 Claims, 5 Drawing Sheets

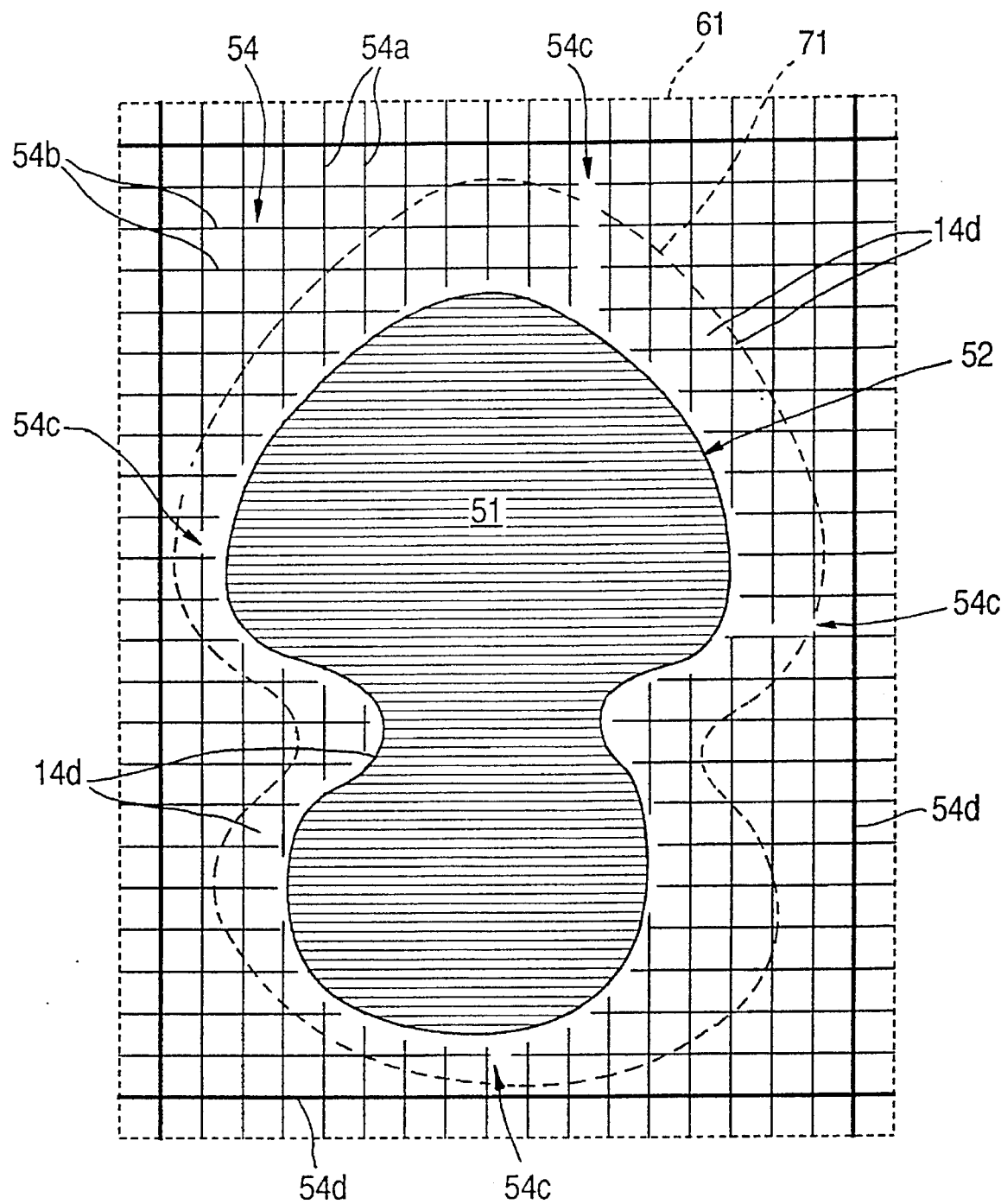

1

PHOTOFORMING METHOD AND APPARATUS

This application is a continuation-in-part of application Ser. No. 08/114,829, filed Sep. 2, 1993, abandoned, which is a division of Ser. No. 08/018,196 filed Feb. 16, 1993, now abandoned.

FIELD OF THE INVENTION

The present invention relates to a photoforming method and apparatus, and more particularly to a photoforming method and apparatus for forming a three-dimensional object from a photohardening resin in a semi-solidification state.

DESCRIPTION OF THE PRIOR ART

A method of fabricating a three-dimensional object by photohardening has recently been proposed. In this method, a photohardenable resin layer is selectively exposed and hardened. The hardened layer is laminated to previously hardened layers to fabricate a three-dimensional object. The hardened layer is formed from a photohardenable resin in non-solidification or semi-solidification states. In comparison with a non-hardened liquid resin, a photohardenable resin in a semi-solidification state (hereinafter referred to as a semi-hardened resin) can be easily handled and a thickness of layers to be laminated can be easily controlled.

A photoforming apparatus using a semi-hardened resin of the above kind is described in Japanese Patent Laid-open Publication No. HEI 2-212131. In this apparatus, a semi-hardened resin in the form of a gel is sheeted by a roller and wound on the roller, and the roller with the semi-hardened resin wound thereon is transferred onto a work table. The semi-hardened resin on the work table is selectively exposed according to a predetermined pattern and then photohardened. The photohardened resin is laminated to previously photohardened resins to form a three-dimensional object. Japanese Patent Laid-open Publication No. SHO 63-141725 describes a photohardening apparatus in which a photohardenable resin is easily handled by forming the photohardening resin into a film shape or a gel shape.

The aforementioned photoforming apparatuses, however, have the disadvantage that means for transferring a semi-hardened resin of sheet shape onto a work table is complicated and therefore the apparatus is increased in size and expensive. In addition, when a long three-dimensional object is formed, the aforementioned roller has to be changed and the aforementioned disadvantage becomes remarkable. Furthermore, if the hardened layer overhangs or has a micro width portion or comprises a plurality of so-called separated islands, the hardened layer cannot be supported suitably. As a result, there is the drawback that the semi-hardened layer tends to deform undesirably and cannot be formed with a high degree of accuracy.

It is, accordingly, an important object of the present invention to provide a method and apparatus which are small in size and inexpensive and capable of photoforming hardened layers with a high degree of accuracy.

SUMMARY OF THE INVENTION

In accordance with one important aspect of the present invention, there is provided a method of photoforming a three-dimensional object, comprising the steps of:

transferring onto a work table a semi-hardened layer of a photohardenable resin separably supported on a base film;

photoforming a hardened layer by exposing the semi-hardened layer, the hardened layer being laminated on a previously hardened layer to photoform the three-dimensional object; and when the hardened layer is photoformed, photoforming a first-region hardened layer forming the three-dimensional object and also a second region hardened layer that is adjacent to the first-region hardened layer through a predetermined space, the first-region hardened layer being supported through a portion of the semi-hardened layer by the second-region hardened layer.

In the photoforming method of the present invention, the first-region hardened layer forming a three-dimensional object to be photoformed is supported through the non-exposed portion of the semi-hardened layer by the second-region hardened layer 54. Accordingly, the first-region hardened can be prevented from deforming undesirably and a three-dimensional object can be photoformed with a high degree of accuracy. The first-region hardened layer and second-region hardened layer include a plurality of upper and lower hardened layers to be laminated. Accordingly, by determining the size of an area of the second-region hardened layer baking into consideration a positional relationship between upper and lower layers, support of a up-and-down direction through upper and lower adjacent semi-hardened layers is possible as well as support within the same layer.

In accordance with another important aspect of the present invention, there is provided an apparatus for photoforming a three-dimensional object, comprising:

transfer means for transferring onto a work table a semi-hardened layer of a photohardenable resin separably supported on a base film; and irradiation means for photoforming a hardened layer by exposing the semi-hardened layer;

the hardened layer being laminated on a previously hardened layer to photoform the three-dimensional object.

In the photoforming apparatus of the present invention, the semi-hardened layer of a photohardenable resin separably supported on the base film is transferred onto the work table by the transfer means, and a hardened layer is photoformed by exposing the semi-hardened layer. The hardened layer is laminated on a previously hardened layer to photoform the three-dimensional object. Accordingly, the photohardenable resin in a semi-solidification state can be easily handled. In addition, the transfer means can also be used as means to separate the base film, without adding an additional mechanism to the transfer means. Accordingly, the apparatus can be made smaller in size and the production cost becomes inexpensive.

BRIEF DESCRIPTION OF THE DRAWINGS

The above and other objects and advantages will become apparent from the following detailed description when read in conjunction with the accompanying drawings wherein:

FIG. 9 is a diagram showing an exposure pattern used to explain the embodiment of FIG. 1.

DESCRIPTION OF THE PREFERRED EMBODIMENTS

Figure 1:
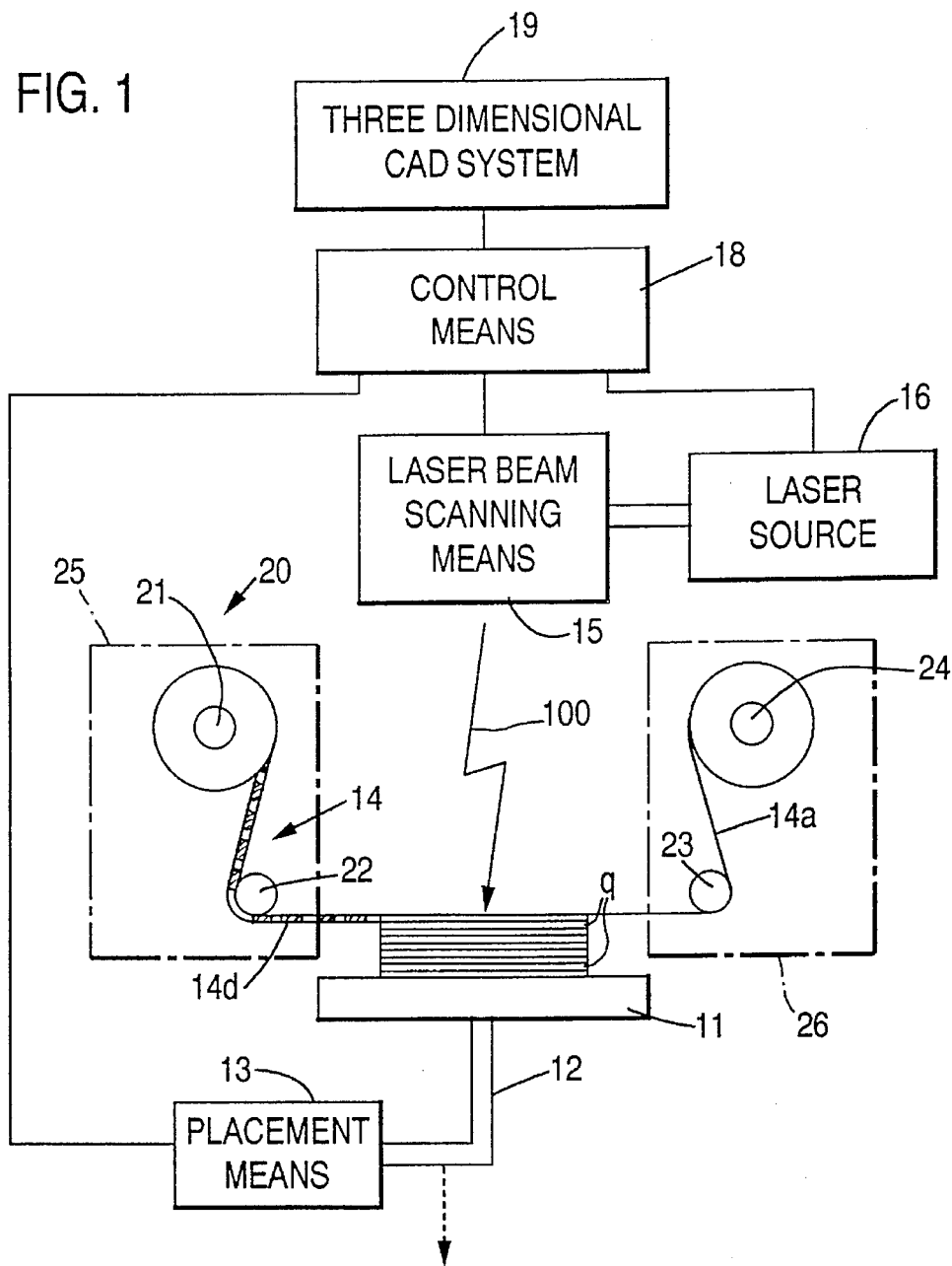
FIG. 1 is a diagrammatic view showing an embodiment of a photoforming apparatus according to the present invention.

FIG. 1 is a diagrammatic view showing a preferred embodiment of a photoforming apparatus in accordance with the present invention.

In FIG. 1, reference numeral 11 denotes a work table, which is secured on a supporting bent arm 12 and raised and lowered through the arm 12 by placement means 13. The placement means 13, for example, comprises a servo motor or screw mechanism (not shown), and positions the work table 11 at a predetermined height and then lowers the work table 11 with a predetermined pitch corresponding to the thickness of a hardened layer to be described later and finally raises the work table 11 to the initial position thereof.

Figure 2:
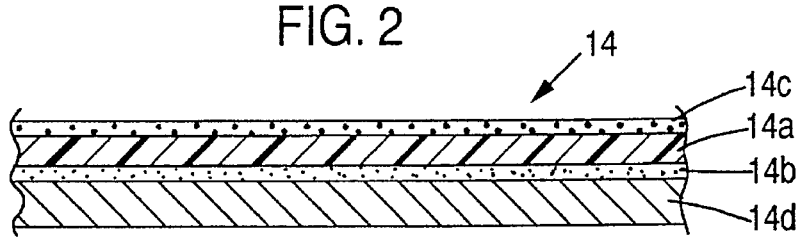
FIG. 2 is a sectional view of the sheet body in FIG. 1.

Reference numeral 14 denotes a ribbon-like sheet body of plasticity that is fed by a sheet feeding unit 20. The sheet body 14, as shown in FIG. 2, comprises a base film of plasticity 14a, a lower separation layer 14b coated on the lower surface of the base film 14a, an upper separation layer 14c coated on the upper surface of the base film 14a, and a photohardenable resin 14d in a semi-solidification state (hereinafter referred to as a semi-hardened layer 14d) supported through the lower separation layer 14b on the base film 14a. The base film 14a comprises a photosensitive film for hardening the semi-hardened layer 14d, such as a PET (polyethylene terephthalate) film having a thickness of, for example, about 50 μm. This base film is coated at the both surfaces thereof with the upper separation layer 14c having a thickness of about 1 μm and the lower separation layer 14b having a thickness of about 1 μm. The semi-hardened layer 14d having a thickness of, for example, about 100 to 300 μm is supported on the lower separation layer 14b. The upper separation layer 14c is one which, when the sheet body 14 rolled up is fed successively, easily separates the semi-hardened layer 14d of the leading sheet body 14 from the base film 14a of the underlying sheet body 14, and the lower separation layer 14b is one by which the semi-hardened layer 14d is not separated from the base film 14a in separating the leading sheet body 14 from the underlying sheet body 14. Finally, the semi-hardened layer 14d of the leading sheet body 14 is completely separated from the base film 14a by the lower separation layer 14b. The semi-hardened layer 14d comprises, for example, a photohardenable resin that hardened by light in infrared, ultraviolet or visible regions. The semi-hardened layer 14d in a monomer state of low viscosity is coated to a uniform thickness to the base film 14a and has been semi-hardened by light energy, heat energy or the like into a gel having a suitable hardness. Note that the sheet body 14 is selected from among a plurality of sheet bodies different in width, depending on the size of an object to be produced.

Laser beam scanning means 15 is provided above the work table 11 and performs a high density raster scanning by focussing a laser beam 100 generated from a laser source 16 to a predetermined position of the semi-hardened layer 14d on the work table 11 through deflection means (not shown) and by scanning the laser beam 100 in main and secondary scan line directions. The image patterns of the laser beam scanning means 15 correspond to the sectional forms of a plurality of the hardened layers q (FIG. 5) of a three-dimensional object, respectively, and the semi-hardened layers 14d are exposed to the laser beam 100 in sequence to produce the hardened layers q. Thus, the laser beam scanning means 15 and the laser source 16 as a whole constitute irradiation means which forms the hardened layer q by selectively exposing to the laser beam 100 the semi-hardened layer 14d on the work table 11. The laser beam 100 generated by the laser source 16 light (e.g., light in an infrared region) that is in conformity with the nature of a photohardenable resin forming the semi-hardened layer 14d.

Reference numeral 18 is control means, which includes a CPU, memories such as RAMs and ROMs, and an I/O interface circuit. The control means 18 is connected with a known three-dimensional CAD (computer aided design) system 19. In response to sectional form data transmitted from the three-dimensional CAD system 19, the control means 18 controls the placement means 13, the laser scanning means 15, the laser source 16, and the sheet feeding unit 20. The three-dimensional CAD 19 transmits to the control means 18 image pattern data corresponding to the section forms of the layers q of a three-dimensional object to be photohardened and also transmits to the control means 18 layer thickness data corresponding to a space between adjacent layers q. Based on a predetermined control program stored in the aforementioned ROM, the control means 18 generates an emission drive signal of the laser source 16 and a scan drive signal of the laser beam scanning means 15 corresponding to the image pattern data transmitted from the three-dimensional CAD system 19. The control means 18 also generates a position correction signal for maintaining a height constant when exposure is operated, and a drive signal of the placement means 13 corresponding to the layer thickness data. These signals are outputted from the control means 18 at a predetermined timing.

The aforementioned sheet feeding unit 20 comprises a film feeding roller 21 and a press roller 22 which are supported on a first carriage 25, and a separation roller 23 and a base winding roller 24 which are supported on a second carriage 26. The sheet feeding unit 20 further comprises drive means (not shown) for driving these rollers and transfer means (not shown) for the carriages 25 and 26. The carriages 25 and 26 ace independently driven. If the carriages 25 and 26 are coupled with each other, then the press roller 22 and the separation roller 23 will be raised by a predetermined amount with respect to the carriages 25 and 26. If, on the other hand, the carriages 25 and 26 are disconnected from each other, the press roller 22 and the separation roller 23 will be pressed against the sheet body 14 with a constant pressure. The speeds of the press roller 22 and the separation roller 23 are also controlled so that the tension on the sheet body 14 is maintained constant. In the sheet feeding unit 20, by moving the film feeding roller 21 and the press roller 22 to the position shown in FIG. 1 from the right side of FIG. 1, the leading portion of the sheet body 14 wounded on the film feeding roller 21 is unwound, and between the press roller 22 and the separation roller 23, the semi-hardened layer 14d of the sheet body 14 is placed on the work table 11. In addition, in the sheet feeding unit 20, by moving the separation roller 23 and the base winding roller 24 to the left side of FIG. 1 and also by winding the base film 14a of the leading portion on the winding roller 24, the base film 14a is separated from the semi-hardened layer 14d (work block) on the work table 11. Thus, the sheet feeding unit 20 functions as transfer means for transferring the semi-hardened layer 14d supported on the base film 14a onto the work table 11 and also functions as separation means for separating the base film 14a from the semi-hardened layer 14d. Note that the aforementioned exposure is performed prior to the separation (or pealing) of the base film 14a. Also, after the separation the work table 11 is lowered, and the rollers 22 and 23 are then raised by the aforementioned coupling of the carriages 25 and 26, and finally the rollers 21, 22, 23 and 24 of the sheet feeding unit 20 are returned back to the right side of FIG. 1.

The operation of the aforementioned embodiment of the present invention will hereinafter be described in detail.

First, a three-dimensional object is designed by the three-dimensional CAD 19, and data representative of the sectional forms and thicknesses of the layers q of the object are made. These data are transmitted to the control means 18, as image pattern data and layer thickness data of the layers q.

In response to the image pattern data, the control means 18 calculates an amount of scan of the laser beam scanning means 15, and sets driving timings of the placement means 13, the laser beam scanning means 15 and the laser source 16. The control means 18 also sets a driving timing of each of the driving means (not shown) of the sheet feeding unit 20. These data can be stored in suitable storing means.

Figure 3:
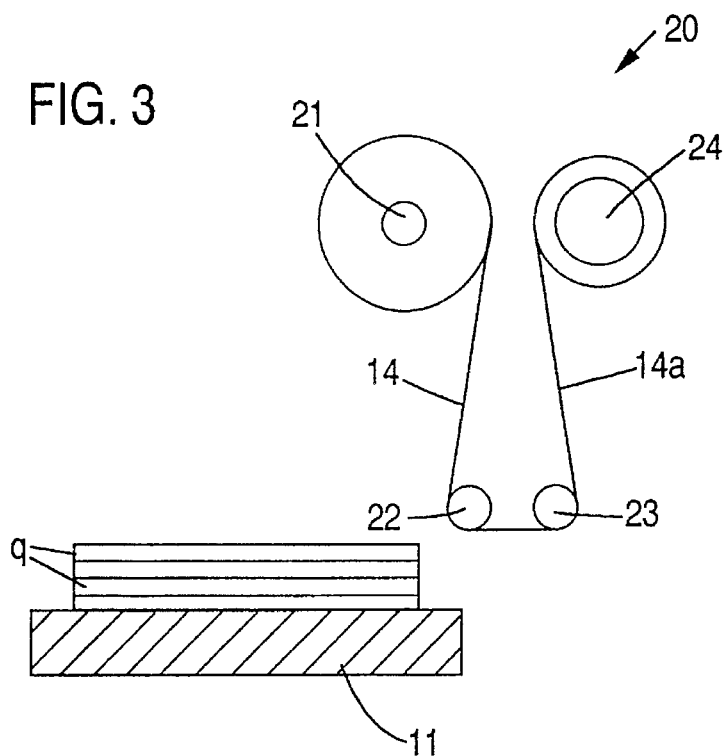
FIG. 3 is a schematic view showing the sheet feeding unit of FIG. 1 positioned in its initial position.
Figure 4:
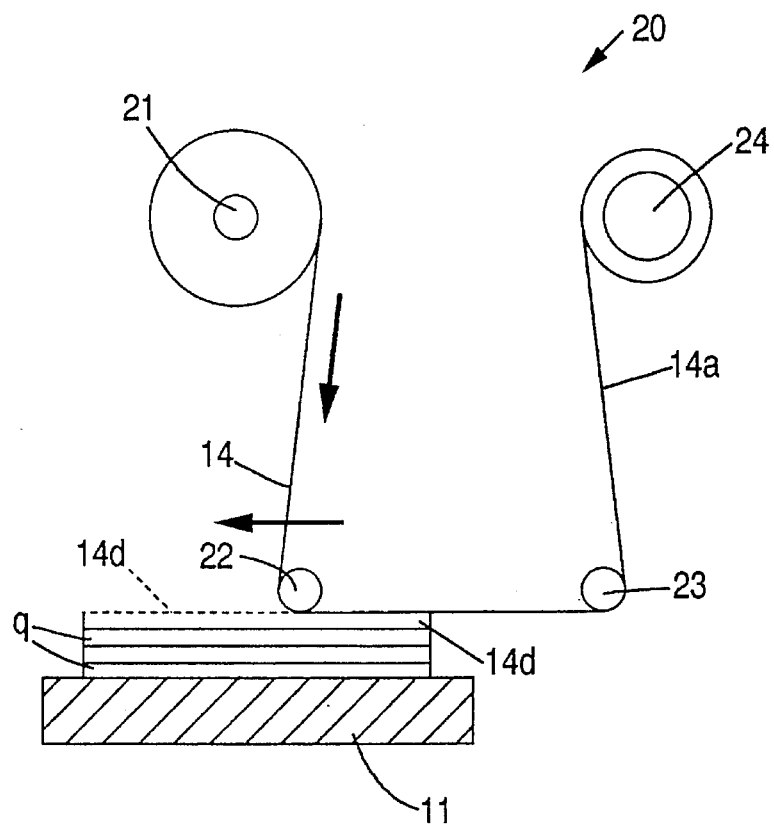
FIG. 4 is a diagram used to explain how the semi-hardened layers are laminated with each other.

According to the signal outputted from the control means 18, the sheet feeding unit 20 is first actuated and the film feeding roller 21 and the press roller 22 positioned in the stand-by position shown in FIG. 3 are moved a predetermined distance toward the left side of FIG. 4. As a result, the sheet body 14 is unwound from the feeding roller 21, and the semi-hardened layer 14 of the sheet body is laminated from its leading end to an underlying layer q previously hardened. During this laminating process, air is pressed out between the semi-hardened layer 14 to be placed on the work table 11 and the underlying hardened layer q, by the press roller 22, and the semi-hardened layer 14d is adhered on the underlying hardened layer q. In addition, position correction by the placement means 13 is made so that the upper surface of the underlying hardened layer q is held at a predetermined height. Further, in order to keep the tension of the base film 14a constant, the feed amount of the sheet body 14 from the film feeding roller 21 and the moving speed of the press roller 22 are maintained constant.

Figure 5:
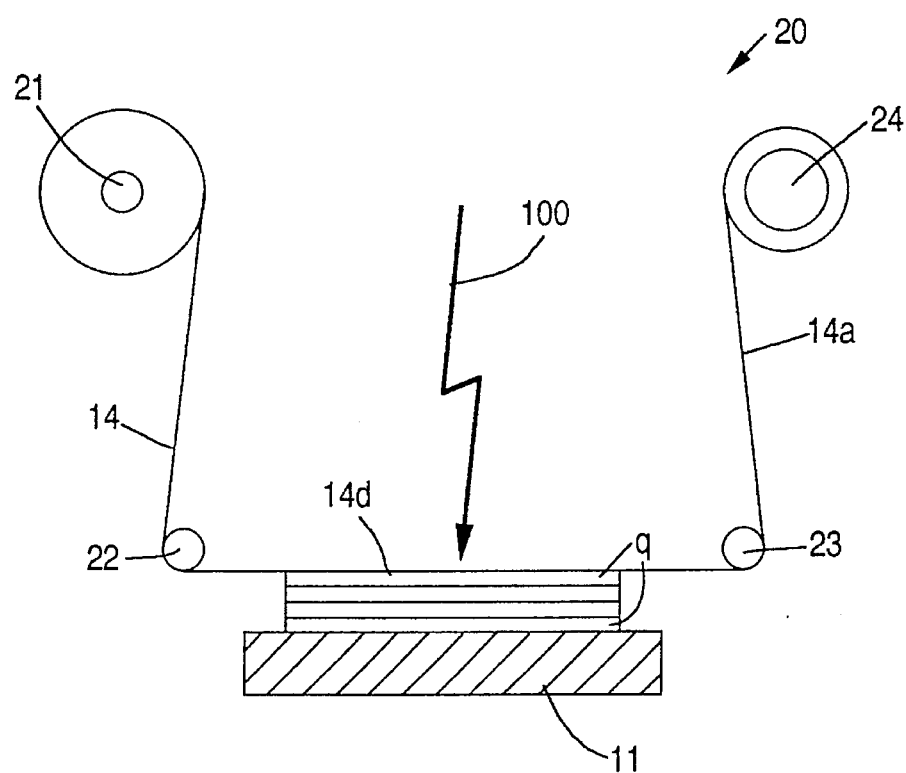
FIG. 5 is a diagram showing the irradiation process of the embodiment of FIG. 1.

Next, in the irradiation process shown in FIG. 5, the laser beam 100 is generated from the laser source 16 according to the aforementioned drive signal, and the laser beam deflected by the laser scanning means 15 is irradiated on the sheet body 14 on the work table 11. The semi-hardened layer 14d of the sheet body 14 on the work table 11 is then exposed to the laser beam 100 according to a predetermined image pattern, and the exposed portion is hardened to the hardened layer q having a sectional form corresponding to the predetermined image pattern. If this hardened layer q is a layer in direct contact with the work table 11, the hardened layer q is adhered to the work table 11 at the same time when the exposed portion is hardened.

Figure 6:
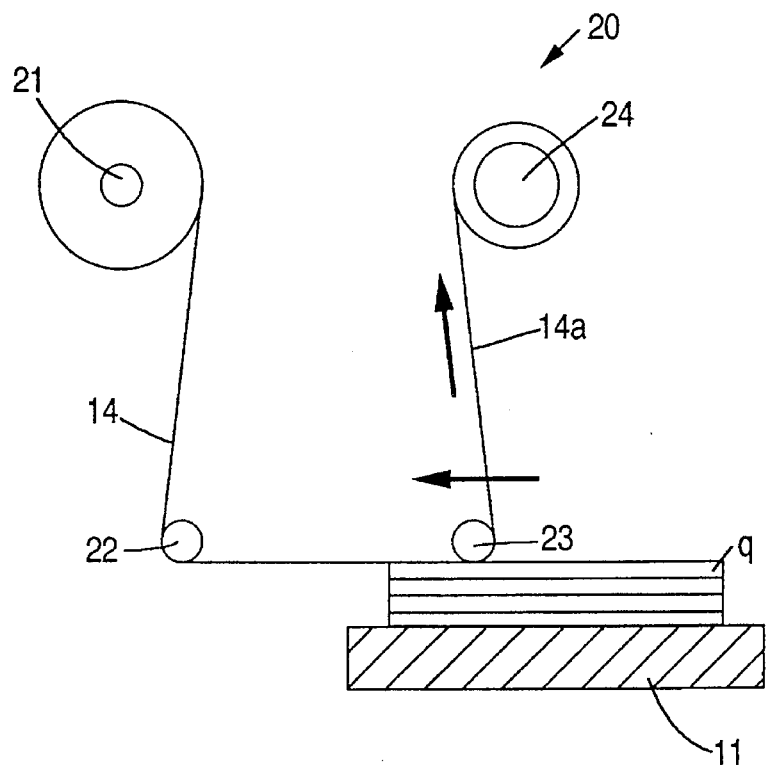
FIG. 6 is a diagram showing the separation process of the embodiment.

Next, in the separation process shown in FIG. 6, the separation roller 23 and the base winding roller 24 are moved toward the left side of the figure, so that the base film 14a on the work table 11 is wound up on the base winding roller 24 and separated from the hardened layer q and the non-hardened part of the semi-hardened layer 14 on the work table 11. During the separation process, the moving speed of the separation roller 23 and the winding speed of the base winding roller 24 are maintained constant so that the winding tension of the base film 14 becomes constant.

Figure 7:
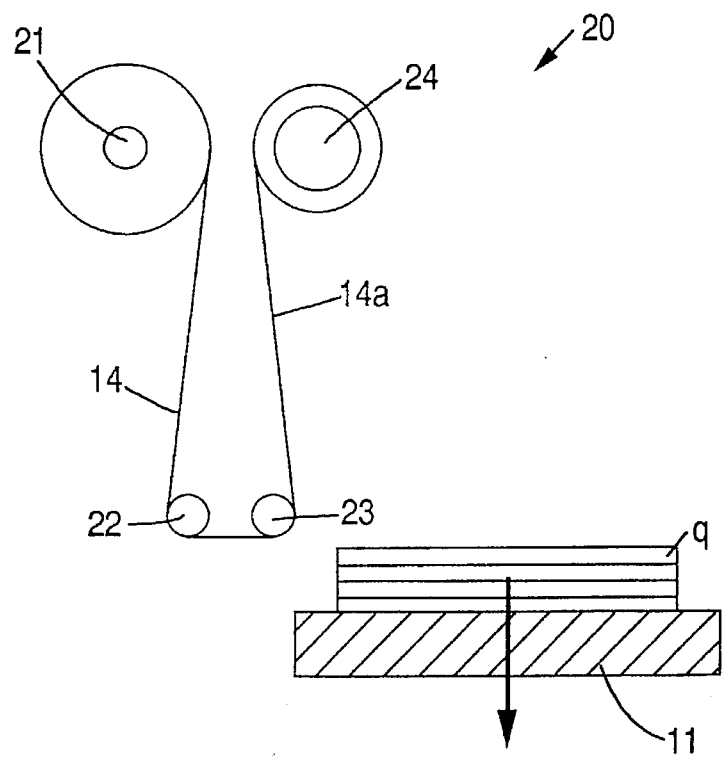
FIG. 7 is a diagram showing the setting process of the embodiment.
Figure 8:
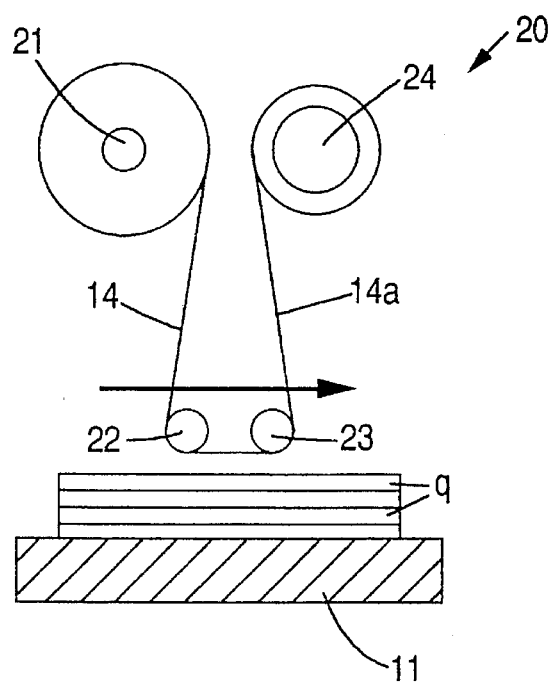
FIG. 8 is a diagram showing the return process of the embodiment.

Next, in the setting process shown in FIG. 7, the press roller 22 and the separation 23 is slightly raised by connecting the first and second carriages 25 and 26 together, and also the work table 11 is lowered by the placement means 13 by an amount corresponding to the thickness of the hardened layer q. Thereafter, in the return process shown in FIG. 8, the film feeding roller 21, the press roller 22, the separation roller 23 and the base winding roller 24 are moved as one body toward the right side of the figure and returned back to the initial position. During this return process, the semi-hardened layer 14d of the sheet body 14 supported by the sheet feeding unit 20 must be moved so that a space is formed between the semi-hardened layer 14d and the hardened layer q.

If the aforementioned processes are completed, then a new hardened layer q will be formed in the same way, and the same processes are repeated until a three-dimensional object is photoformed.

Thus, in the aforementioned embodiment of the present invention, the base film 14a of the sheet body 14 is moved by suitably rotating and moving the rollers 21, 22, 23 and 24 of the sheet feeding unit 20, and only the semi-hardened layer 14d is placed on the work table 11 by separating the base film 14a from the sheet body 14 placed on the work table 11. Accordingly, the semi-hardened layer 14 in the form of a gel can be easily handled. In addition, the sheet feeding unit 20 for feeding the sheet body 14 can also be used as means to separate the base film 14a, without adding an additional mechanism to the feeding unit 20. Accordingly, the apparatus can be made smaller in size and the production cost becomes inexpensive.

While in the aforementioned embodiment the exposure has been performed before the base film 14a of the sheet body 14 is separated from the semi-hardened layer 14d on the work table 11, it is noted that the semi-hardened layer 14d may also be exposed after the separation. It is preferable that whether the exposure is performed after or before the separation be selected depending on the characteristics of a photohardenable resin forming the semi-hardened layer 14d.

On the other hand, in a case where a layer q to be hardened has a micro width or comprises a plurality of so-called separated islands, the layer q tends to deform undesirably, because the layer can not be supported on the underlying layer or is unstable. In addition, if the hardened layer q overhangs when laminating, it also tends to deform undesirably. Therefore, when a three-dimensional object is required to be photoformed with a high degree of accuracy, it is necessary to prevent such an undesirable deformation of the hardened layer q.

FIG. 9 illustrates another embodiment of the present invention which is capable of effectively preventing the aforementioned undesirable deformation of the hardened layer q. In this embodiment, when a hardened layer q is formed by exposing to a laser beam the semi-hardened layer 14d of the sheet body 14 placed on the work table 11, a first-region hardened layer (not shown) forming a portion of an object is formed within a work area 51, in a mat area 61 wherein semi-hardened layers 14d are laminated on the work table 11. The first-region hardened layer may have the same sectional form as that of the work area 51 or have an open area within the work area 51. In addition to the first-region hardened layer, a second-region hardened layer 54 is formed so that it is spaced a grid gap 52 (predetermined gap) from the first-region hardened layer in the work area 51. This second-region hardened layer 54, for example, comprises a net-like layer having a plurality of hardened portions 54a and 54b extending in the main and secondary scan lines, and can be divided into several parts through a plurality of slits 54c. The hardened portions 54a and 54b of the second-region hardened layer 54 are integrally connected by a grid frame 54d. The second-region hardened layer 54 functions as supporting means for guiding and supporting the first-region hardened layer at a predetermined position through a portion of the semi-hardened layer 14d remaining as a gel within the grid gap 52. It is noted that if the first-region hardened layer has an open portion, the second-region hardened layer can be formed independently within the work area 51.

The aforementioned hardened layer q is assumed to be a hardened layer of a first layer, and the formation process of hardened layers q of upper layers overlying the first layer will hereinafter be described.

When a hardened layer q of a second layer is formed, a second-region layer hardened layer 54 is formed in the same way described above, if a first-region hardened layer of the second layer is identical in sectional form with a first-region hardened layer of the first layer and also with a first-region hardened layer of a third layer. When, on the other hand, a first-region hardened layer of the third layer, for example, has a sectional form indicated by the broken lines 71 of FIG. 9, a second-region hardened layer in the hardened layer q of the second layer is formed outside the sectional form indicated by the broken lines 71, and the second-region hardened layer 54 of the first layer and the first-region hardened layer of the third layer are formed so that they are adjacent to each other through the semi-hardened layer 14d of the second layer. The semi-hardened layer 14d of the second layer is formed to be partly overlapped at a predetermined width 52, preferably narrow width, along its periphery with the semi-hardened layer of the lower layer. That is, in upper and lower adjacent hardened layers q, they are formed so that the first-region hardened layer of one layer is not in direct contact with the second-region hardened layer of the other layer and that the first-region hardened layer of the upper layer is supported through the semi-hardened layer 14d by the lower layer. Note that the semi-hardened layer 14d of the intermediate layer supporting the first-region hardened layer of the upper layer can be partly formed with hardened layers which function as supporting means.

When a hardened layer q of a fourth or above layer is formed, it is formed in the same way described above. The semi-hardened layer of the third layer or above layer is formed to be partly overlapped at the predetermined width 52 along its periphery with the semi-hardened layer of the lower layer. That is, in upper and lower adjacent hardened layers q, they are formed so that the first-region hardened layer of one layer is not in direct contact with the second-region hardened layer of the other layer and that the first-region hardened layer of the upper layer is supported through the semi-hardened layer 14d by the lower layer. The second-region hardened layer of each layer has an inner side surface which is as close as possible to a peripheral side surface of the first-region hardened layer portion of the same layer while being spaced apart from the first-region hardened layer portions of the layers immediately above and below. In other words, the second-region hardened layer portion is as close as possible to the first-region hardened layer portion of its layer without touching the first-region hardened layer portions of the layers immediately above and below its layer. By this structure, if the first-region hardened layer portion has an overhang protruding greatly relative to the first-region hardened layer portions of several layers immediately below, the overhang is supported, through an immediately lower endless semi-hardened layer portion, by the second-region hardened layer portion of the layer immediately below the endless semi-hardened layer portion.

Thus, in the second embodiment of the present invention, the first-region hardened layer forming an object is guided and supported through the non-exposed portion of the semi-hardened layer 14d by the second-region hardened layer 54 and the like. Accordingly, the first-region hardened can be prevented from deforming undesirably and a three-dimensional object can be photoformed with a high degree of accuracy. In addition, by determining the size of an area of the second-region hardened layer taking into consideration a positional relationship between upper and lower layers, support of a up-and-down direction through upper and lower adjacent semi-hardened layers is possible as well as support within the same layer. Even if the first-region hardened layer is overhung, an undesirable deformation thereof can be prevented effectively.

While laser scanning means capable of a high-density raster scanning has been used in the aforementioned embodiments, it is noted that, as the irradiation means of the subject invention, various lights corresponding to the natures of photohardenable resins can be used as movable spot beams or can be used as light beams that are shaped into predetermined cross sections through a mask. Also, the sheet body is not always in the form of a roll, but it may also use base films cut to a predetermined size. Even if the cut base films are used, the sheet can be easily handled through the base films, because the transferring means for transferring the sheet body onto the work table can be made structurally simpler.

While the subjection invention has been described with relation to the preferred embodiments, various modifications and adaptations thereof will now be apparent to those skilled in the art. All such modifications and adaptations as fall within the scope of the appended claims are intended to be covered thereby.

What I claim is:

1. A method of producing a three-dimensional object by repeatedly irradiating a semi-hardened layer of a photohardenable resin separably supported on a transparent base film as a gel to form a hardened layer which is to be laminated on a previously formed hardened layer, comprising:

(1) a first step of transferring said semi-hardened layer of said photohardenable resin separably supported on said transparent base film onto said previously formed hardened layer;

(2) a second step of irradiating partly said semi-hardened layer through said transparent base film to produce a first hardened layer and a first semi-hardened layer portion, said first hardened layer consisting of a first-region hardened layer portion and a second-region hardened layer portion, said first-region hardened layer portion to be formed into part of said three-dimensional object within a first work area, said second-region hardened layer portion being constituted by forming a first net-like layer divided by a plurality of slits into a plurality of net-like parts, each net-like part spaced by a first gap from said first-region hardened layer portion and connecting said net-like parts with a grid frame surrounding said first net-like layer to integrally connect the net-like parts of said net-like layer, and said second-region hardened layer portion guiding said first-region hardened layer portion at a predetermined position through part of said first semi-hardened layer portion remaining as said gel within said first gap;

(3) a third step of separating said base film from said first hardened layer and said first semi-hardened layer portion;

(4) a fourth step of transferring an additional semi-hardened layer of said photohardenable resin separably supported on said transparent base film as a gel onto said first hardened layer and said first semi-hardened layer portion;

(5) a fifth step of irradiating partly said additional semi-hardened layer through said transparent base film to produce a second hardened layer and a second semi-hardened layer portion, said second hardened layer consisting of a first-region hardened layer portion and a second-region hardened layer portion, the first-region hardened layer portion of said second hardened layer to be formed into part of said three-dimensional object within said first work area, the second-region hardened layer portion of said second hardened layer being constituted by forming a second net-like layer divided by a plurality of slits into a plurality of net-like parts, each net-like part spaced by a second gap from said first-region hardened layer portion of said second hardened layer to be formed outside a predetermined section area and connecting said nets-like parts with a grid frame surrounding said second net-like layer to integrally connect the net-like parts of said net-like layer, and part of said second semi-hardened layer portion being overlapped with said first semi-hardened layer portion and guiding said first region hardened layer portions of said first and second hardened layers through part of said first and second semi-hardened layer portions remaining as said gel within said first and second gaps;

(6) a sixth step of separating said base film from said second hardened layer and said second semi-hardened layer portion;

(7) a seventh step of transferring a further additional semi-hardened layer of said photohardenable resin separably supported on said transparent base film as a gel onto said second hardened layer and said second semi-hardened layer portion;

(8) an eighth step of irradiating partly said further additional semi-hardened layer through said transparent base film to produce a third hardened layer and a third semi-hardened layer portion, said third hardened layer consisting of a first-region hardened layer portion and a second-region hardened layer portion, the first-region hardened layer portion of said third hardened layer to be formed into part of said three-dimensional object with said predetermined section area, said second-region hardened layer portion of said third hardened layer being constituted by forming a third net-like layer divided by a plurality of slits into a plurality of net-like parts each net-like part spaced by a third gap from said first-region hardened layer portion of said third hardened layer and connecting said net-like parts with a grid frame surrounding said third net-like layer to integrally connect the net-like parts of said third net-like layer, and the first-region hardened layer portion produced in the present step having an overhang portion protruding beyond said first-region hardened layer portions of said first and second hardened layers so as to face the second-region hardened layer portion of said first hardened layer, whereby said second-region hardened layer portion of said first hardened layer supports said overhang portion of said first-region hardened layer portion produced in the present step through said second semi-hardened layer portion previously produced; and (9) a ninth step of separating said base film from said third hardened layer and said third semi-hardened layer portion.

2. The method of claim 1, wherein said gel fills said gaps.

3. A method of producing a three-dimensional object by irradiating semi-hardened layers of a photohardenable resin each separably supported on a transparent base film as a gel, each of said semi-hardened layers being divided by the irradiation into a first region hardened layer portion to be formed into part of said three-dimensional object, a second-region hardened layer portion, and a semi-hardened layer portion, comprising:

(1) a first step of transferring said semi-hardened layer of said photohardenable resin separably supported on said transparent base film as said gel onto previously formed first-region and second-region hardened layer portions and a previously formed semi-hardened layer portion;

(2) a second step of irradiating partly said semi-hardened layer through said transparent base film to produce said first-region and second-region hardened layer portions spaced by a gap from each other with said semi-hardened layer portion remaining as said gel within said gap, said second-region hardened layer portion being constituted by forming said second, region hardened layer portion divided by a plurality of slits into a plurality of parts, each part having an inner side surface which is as close as possible to a peripheral side surface of said first region hardened layer portion under the condition that said second-region hardened layer portion is spaced apart from immediately upper and lower first-region hardened layer portions and that the first-region hardened layer portion of the immediately upper layer is supported by the second-region hardened layer portion of the immediately lower layer through the semi-hardened layer portion remaining within said gap between the first-region and second-region hardened layer portions produced in the present step;

(3) a third step of separating said base film from said first-region and second-region hardened layer portions and said endless semi-hardened layer portion; and (4) a fourth step of repeating said first, second and third steps until said three-dimensional object is formed by the first-region hardened layer portions.

4. The method of claim 3, wherein said gel fills said gap.

5. A method of producing a three-dimensional object by repeatedly irradiating a semi-hardened layer of a photohardenable resin separably supported on a transparent base film as a gel to form a hardened layer which is to be laminated on a previously formed hardened layer, comprising:

(1) a first step of transferring said semi-hardened layer of said photohardenable resin separably supported on said transparent base film onto said previously formed hardened layer;

(2) a second step of irradiating partly said semi-hardened layer through said transparent base film to produce a first hardened layer and a first semi-hardened layer portion, said first hardened layer consisting of a first-region hardened layer portion and a second-region hardened layer portion, said first-region hardened layer portion to be formed into part of said three-dimensional object within a first work area, said second-region hardened layer portion being constituted by forming a first net-like layer divided by a plurality of slits into a plurality of net-like parts, each net-like part spaced by a first gap from said first-region hardened layer portion and connecting said net-like parts with a grid frame surrounding said first net-like layer to integrally connect the net-like parts of said net-like layer, and said second-region hardened portion guiding said first-region hardened layer portion at a predetermined position through part of said first semi-hardened layer portion remaining as said gel within said first gap;

(3) a third step of separating said base film from said first hardened layer and said first semi-hardened layer portion;

(4) a fourth step of transferring an additional semi-hardened layer of said photohardenable resin separably supported on said transparent base film as a gel onto said first hardened layer and said first semi-hardened layer portion;

(5) a fifth step of irradiating partly said additional semi-hardened layer through said transparent base film to produce a second hardened layer and a second semi-hardened layer portion, said second hardened layer consisting of a first-region hardened layer portion and a second-region hardened layer portion, the first-region hardened layer portion of said second hardened layer to be formed into part of said three-dimensional object within said first work area, the second-region hardened layer portion of said second hardened layer being constituted by forming a second net-like layer divided by a plurality of slits into a plurality of net-like parts each net-like part spaced by a second gap from said first-region hardened layer portion of said second hardened layer and connecting said net-like parts with a grid frame surrounding slid second net-like layer to integrally connect the net-like parts of said net-like layer, and part of said second semi-hardened layer portion being overlapped with said first semi-hardened layer portion and guiding said first region hardened layer portions of said first and second hardened layers through part of said first and second semi-hardened layer portions remaining as said gel within said first and second gaps;

(6) a sixth step of separating said base film from said second hardened layer and said second semi-hardened layer portion;

(7) a seventh step of transferring a further additional semi-hardened layer of said photohardenable resin separably supported on said transparent base film as a gel onto said second hardened layer and said second semi-hardened layer portion;

(8) an eighth step of irradiating partly said further additional semi-hardened layer through said transparent base film to produce a third hardened layer and a third semi-hardened layer portion, said third hardened layer consisting of a first-region hardened layer portion and a second-region hardened layer portion, the first-region hardened layer portion of said third hardened layer to be formed into part of said three-dimensional object, said second-region hardened layer portion of said third hardened layer being constituted by forming a third net-like layer divided by a plurality of slits into a plurality of net-like parts, each net-like part, spaced by a third gap from said first-region hardened layer portion of said third hardened layer and connecting said net-like parts with a grid frame surrounding said third net-like layer integrally connect the net-like parts of said third net-like layer, said second-region hardened layer portion of said second hardened layer being spaced from the first-region hardened layer portions of said first and third hardened layers, and the first-region hardened layer portion produced in the present step having an overhang portion protruding beyond said first-region hardened layer portions of said first and second hardened layers so as to face the second region-hardened layer portion of said first hardened layer, whereby said second-region hardened layer portion of said first hardened layer supports said overhang portion of said first-region hardened layer portion produced in the present step through said second semi-hardened layer portion previously produced; and (9) a ninth step of separating said base film from said third hardened layer and said third semi-hardened layer portion.

6. The method of claim 5, wherein said gel fills said gaps.

\* \* \* \* \*